2 Sheets—Sheet 1.

C. H. BOYD.
Seed-Planter

No. 197,323. Patented Nov. 20, 1877.

WITNESSES:
CClarence Poole
Geo H Evans

INVENTOR:
Charles H. Boyd
per attys
A. H. Evans & Co.

2 Sheets—Sheet 2.

C. H. BOYD.
Seed-Planter

No. 197,323. Patented Nov. 20, 1877.

WITNESSES:
Clarence Poole
Geo. H. Evans

INVENTOR:
Charles H. Boyd
per attys
A. H. Evans & Co.

UNITED STATES PATENT OFFICE.

CHARLES H. BOYD, OF DRESDEN, OHIO.

IMPROVEMENT IN SEED-PLANTERS.

Specification forming part of Letters Patent No. 197,323, dated November 20, 1877; application filed September 3, 1877.

*To all whom it may concern:*

Be it known that I, C. H. BOYD, of Dresden, Muskingum county, State of Ohio, have invented certain new and useful Improvements in Machines for Planting Corn and other Seeds, of which the following is a clear, full, and exact description, reference being made to the accompanying drawings, forming a part of this specification, in which—

Figure 1:
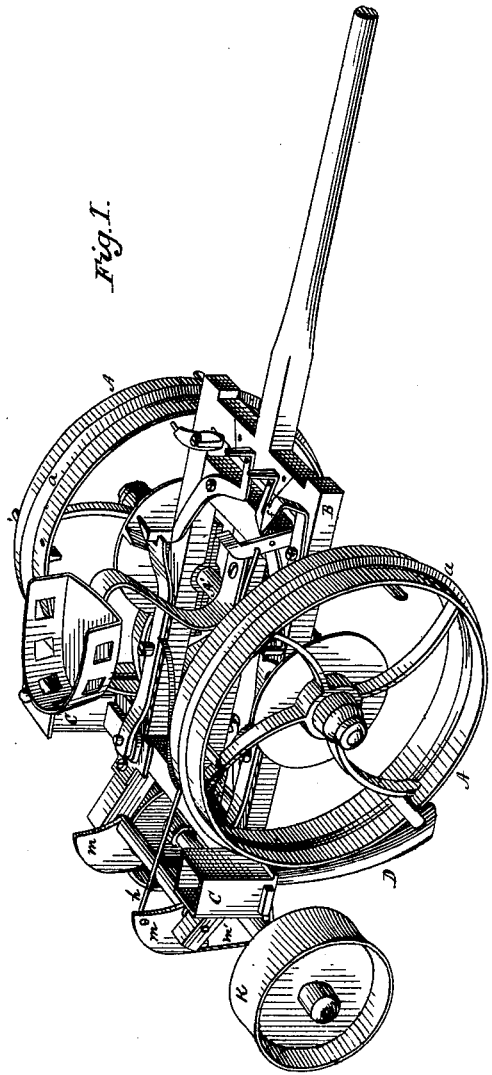
Figure 2:
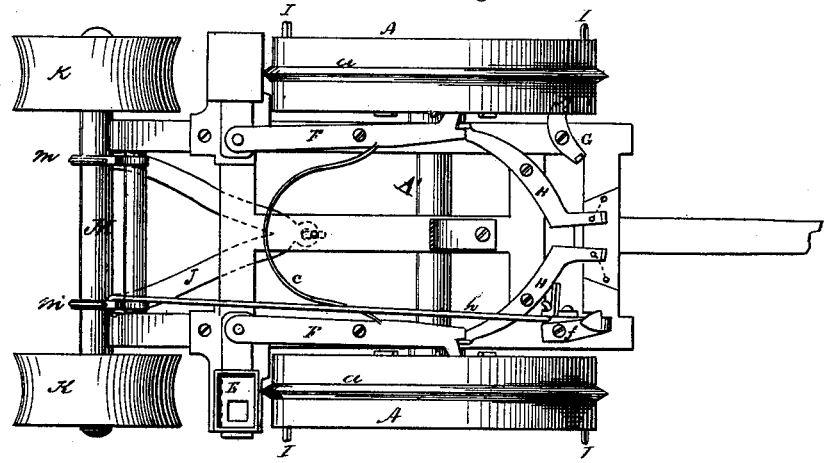
Figure 3:
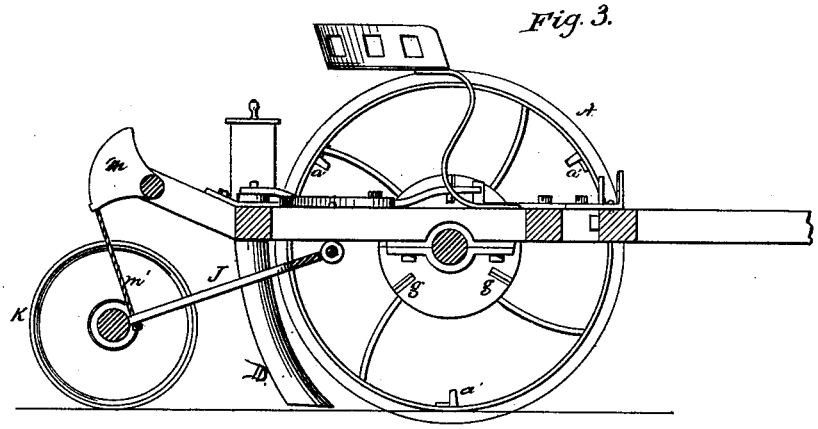

Figure 1 is a perspective view of my machine. Fig. 2 is a top or plan-view, and Fig. 3 is a sectional view.

My invention relates to the class of seeding-machines adapted to mark and furrow the ground, and drop and cover the corn or other seed; and the invention consists in the general construction and arrangement of parts, as will be hereinafter fully described.

In the drawings, A A represent the drive or ground wheels, each being provided on its periphery with an annular V-shaped projection, $a$, for the purpose of preparing or forming the furrow in the soil to receive the dropped seed.

The wheels A are secured to the axle A', so that the wheel and axle turn together, the axle being journaled in the frame B of the machine.

C C represent the seed-receptacles, secured to the frame B, and directly in rear of the wheels A. D D are the curved seed-ducts, arranged to deliver the seed in the furrows directly in the rear of the wheels A. E E are perforated slides arranged in the bottom of the seed-receptacles, and are automatically operated through the medium of the pivoted connecting-levers F F, and the projecting ribs $g$ on the inner sides of the disks attached to the hubs of wheels A, and said levers and slides are held in working position by the elliptic spring $c$. Said levers are also thrown in and out of gear with the projecting ribs $g$ by means of the pivoted foot-levers H H, arranged on top of the frame of the machine, whereby the operator is enabled to plant one or two rows, or part or parts of rows, or more, as desired. The projecting ribs $g$ on the wheels are relatively arranged in relation to each other, whereby the action of the dropping-levers F will be simultaneous, so that if the planting of the seed always commences from the same line the rows will always be regular and even, whereby the plants may be cultivated crosswise, as well as direct.

G is a pivoted lever arranged to operate in connection with projections $a'$ on the inner face of the wheel for locking the same, so as to enable the operator, in turning or otherwise, to place the machine in proper position to commence planting the seed. The wheels A are provided with markers I, connected with the outer rim, and at equal distances apart, and arranged at such a distance relative to the projecting ribs $g$ that when the machine is put in position for planting with the said markers on the ground, at the point where the dropping is to commence, and the machine then put in motion, the dropping or planting will occur exactly at the points indicated by the markers.

The seed is covered by means of a rear truck, J, provided with concave-surface wheels K K. Said truck, with its wheels, is raised and carried, in turning or moving the machine, through the medium of the foot-lever $h$, connecting-rod, segments $m\ m$ on the shaft M, and ropes or chains $m'$, connected with said segments and the truck-frame, the truck-frame being held in a raised position by means of the foot-lever and notched plate $f$ on the front of the frame of the marker.

Having thus fully described my invention, what I claim as new, and desire to secure by Letters Patent, is—

The combination, with the wheels A, provided with disks having ribs $g$, and seed-receptacles having seed-ducts D, of the slides E, pivoted levers F, elliptic springs $c$, and foot-levers H, the several parts constructed and relatively arranged to operate substantially as herein shown and described.

CHARLES H. BOYD.

Witnesses:
 B. F. POWER,
 W. R. HENDERSON.